Figure 3:
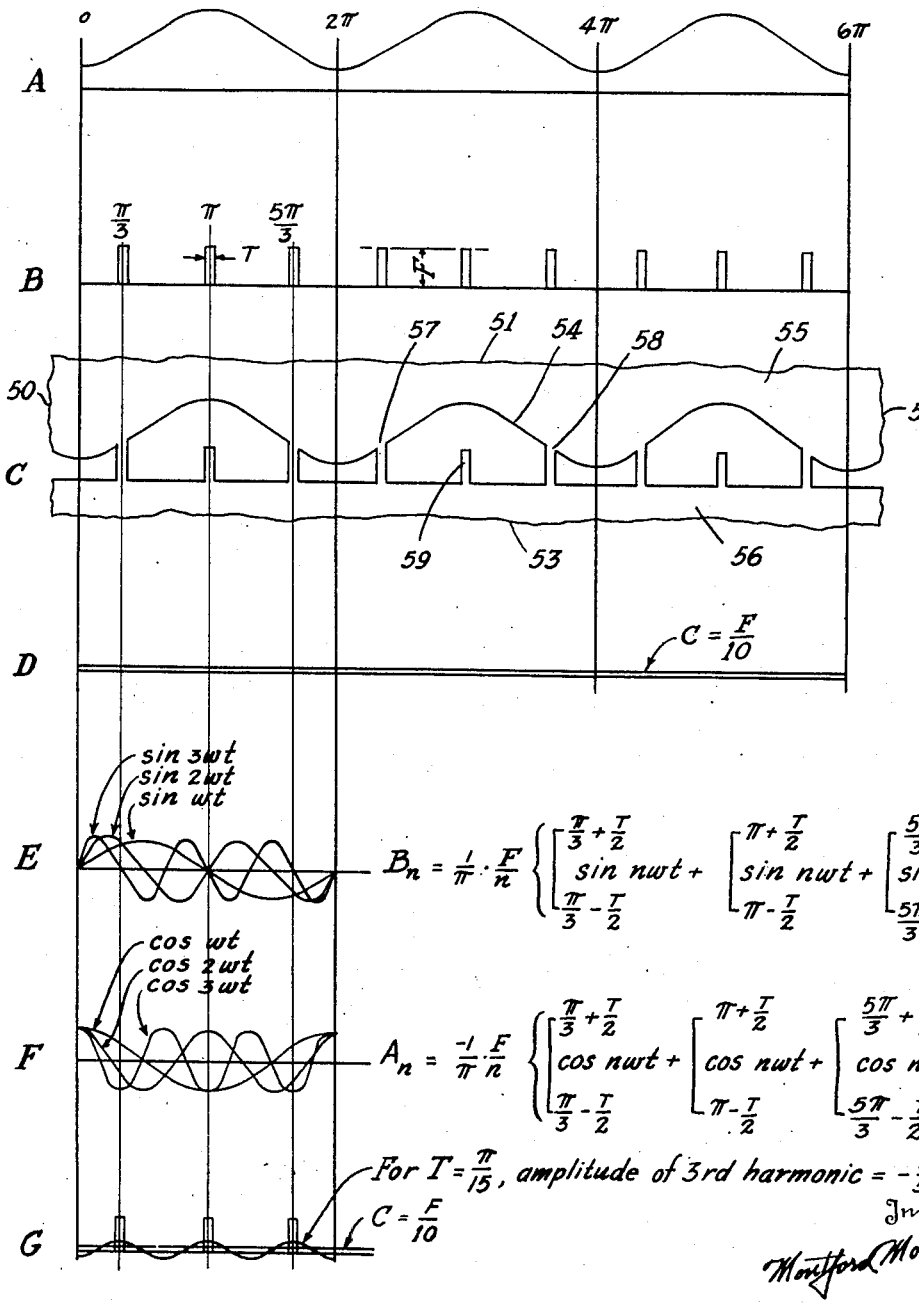

March 18, 1952  M. MORRISON  2,589,421
LUMINOUS FLUX MODULATOR
Original Filed July 7, 1945  2 SHEETS—SHEET 1
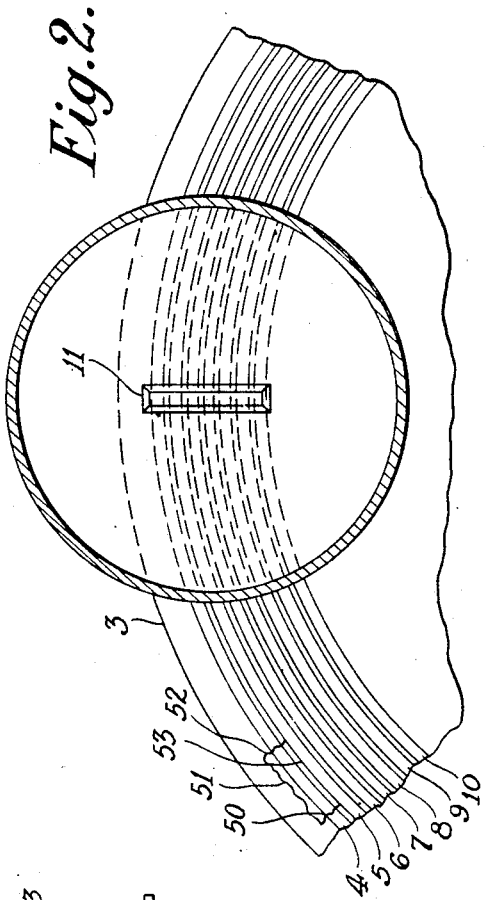
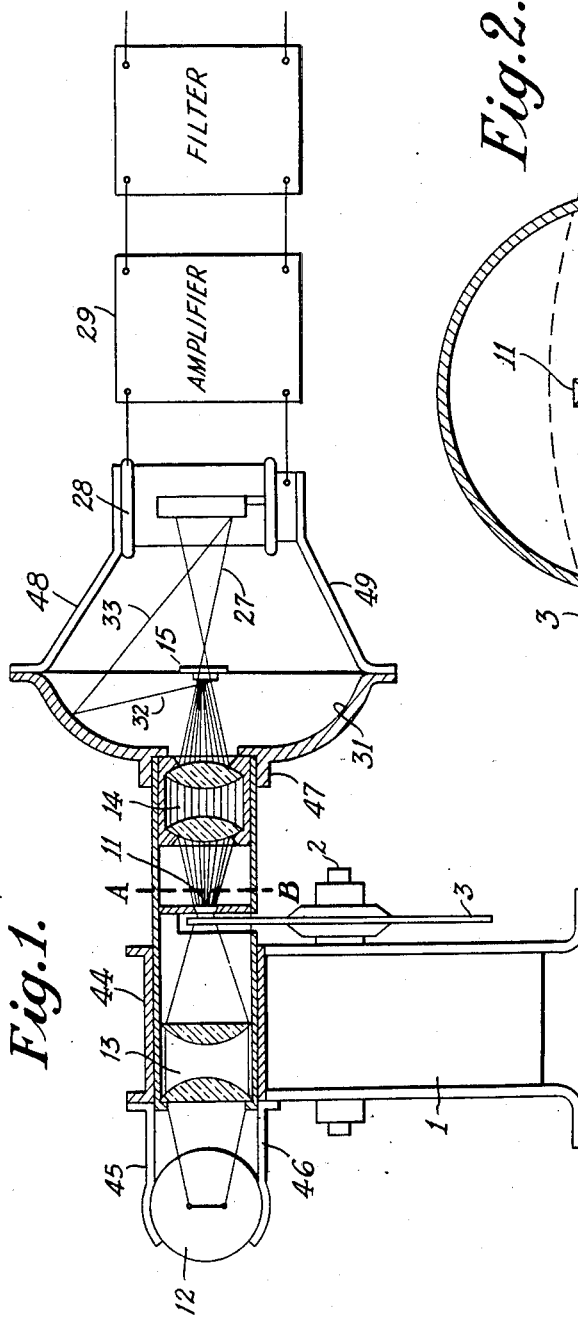
Inventor
Moutford Morrison Patented Mar. 18, 1952

2,589,421

UNITED STATES PATENT OFFICE 2,589,421

LUMINOUS FLUX MODULATOR

Montford Morrison, Upper Montclair, N. J.

Original application July 7, 1945, Serial No. 603,717. Divided and this application July 3, 1946, Serial No. 681,215

3 Claims. (Cl. 88—61)

The present invention relates to photoelectric modulators for generators of alternating currents and systems therefor, and has particular reference to multi-channel carrier signal systems employing such generators.

The present application is a division of application Serial No. 603,717, filed July 7, 1945, now abandoned.

An object of the invention is to provide a luminous flux modulator, for photoelectric generation of alternating currents having a wave-form which is free of harmonic frequencies of the fundamental frequency of the wave-form only up to a predetermined order.

Another object of the invention is to provide a luminous flux modulator generating waveforms, which are continuous in effect, from discrete perforations which may be made in various modulator structures, such as plates, belts, hollow cylinders and any suitable homeoid of revolution.

Another object of the invention is to provide for photoelectric generators a one-piece luminous flux modulator which does in fact have, in effect, perforated patterns which have the form of complete sine-waves.

A further object of the invention is to provide a multi-channel carrier-current signal transmission system which is particularly adapted to carrier-current waves of the forms produced by my luminous flux modulator.

Several prior patents have disclosed photoelectric generators employing revolving opaque discs with openings therein described as light modulators having "sinusoidal" openings therein and producing "sinusoidal" variations in light flux.

A first structure which may be said to represent a pioneer patent in the photoelectric generator field employs an opening having the form of a half-sinusoid, but fails to teach how such an opening can be made to produce a complete sine wave of generated current and it is obvious that no such wave can be produced by such a structure.

A second structure is believed to be the first patent to disclose a light modulating disc of opaque material having a plurality of concentrically arranged rows of sinusoidal openings therein. These openings do in fact produce sinusoidal light modulations in the particular structure disclosed. However, the disclosed modulating disc requires a plurality of cooperating slits and therefore, under any set of objective operational conditions, the modulated beam has a lateral sweeping motion added to the light flux modulation. This structure cannot be made to produce sinusoidal modulations with a stationary slit or so function with a stationary beam. It is not disclosed as a photoelectric carrier-current signal system, nor is it obvious that it could be used as such.

A third structure utilizes a light modulating system employing a transparent glass or Celluloid disc without openings therein, but with sinusoidal traces thereon.

A fourth structure comprises a disc like that of the second structure applied to an optical system like that of the third structure, providing a stationary modulated beam, which combination permits its use as a scanning means in a photoelectric carrier-current signal system. This fourth structure employs discrete openings of the exact form of a half-sinusoid in a disc, which openings are described as "sinusoidal." While such openings may be said to be partly sinusoidal in character, they cannot be modified by extension to be completely sinusoidal in form, as is critical to the objectives of this disclosure under the requirements set forth.

An attempt to make the openings of the fourth structure completely sinosoidal would result in destroying the disc by cutting it into ring-shaped pieces. For this reason the disc of the second structure applied to the optical system of the third structure cannot be made to produce completely sinusoidal light modulations in form, as is required for carrier-current signal systems, but only luminous-flux modulations which are partly sinusoidal in character, which is a different thing and not operatively applicable to such systems.

The applicant has discovered that luminous-flux modulators can be constructed having continuous wave-form modulation boundaries in continuous circuitous paths bridged by crossties to form an integral physical structure between the two modulation boundaries, without introducing harmonics into the modulation pattern below a certain order.

By fixing the order of the harmonic content of the modulation boundaries, introduced by the bridging structure at a numerical value above the frequency responsive receiving system, the modulator is caused to produce, in effect, complete sine waves which are functionally continuous and purely sinusoidal within the frequency response of the receiver of the waves. Alternating currents having wave-forms generated by my modulators not only meet the requirements of carrier-current signal systems, but are particularly suited thereto.

By the employment of this invention, it is possible to construct luminous flux modulators out of thin sheet material by perforating a modulation pattern into it which is effectively continuous and which does not destroy the integral structure of the sheet material.

The perforations are not limited to plates but also may be employed in the form of belts, as is common practice in the sound reproducer art for testing sound reproducer systems for frequency response. These perforations may be applied to hollow cylinder modulators such as are found in the teleprinter art, and in fact may be applied to any suitable form of homeoid of revolution. However, in the present application, for conciseness and clearness of teaching, the embodiment of the invention herein described will be limited to a system employing a revolving plate, though the modulation structure disclosed is applicable to any of the forms of modulator structure referred to above.

Further and other objects will be apparent and pointed out on reading the specification hereunder, particularly when taken in connection with the drawings in which Fig. 1 is an elevation, partly in section, illustrating my carrier-current transmission system; Fig. 2 is an enlargement of a section taken through Fig. 1 along the lines A—B looking west; and Fig. 3 shows, on a still more enlarged scale, the perforation details of the modulation perforations of the disc shown in Fig. 2 together with curves which assist in the teaching of the employment of my invention.

Referring to Fig. 1, 1 is a highly constant speed form of motor preferably driven from a direct-current source, as described in my copending patent application Serial No. 496,389, filed July 28, 1943, now Patent No. 2,415,022 which issued January 28, 1947. This form of motor has a constancy of speed of the order of 0.01% and forms an excellent means of fixing the frequencies generated by my modulator hereinafter described. Motor 1 is provided with a shaft 2 onto which is fixed a disc 3 which forms the luminous flux modulator which I employ. While I have shown a disc form of luminous flux modulator in the figure, I may use any of the other forms enumerated above. The disc modulator 3 is shown in enlarged detail in the form of a segment in Fig. 2. The disc modulator 3 has a plurality of completely circular modulating tracks, 4, 5, 6, 7, 8, 9 and 10, which are provided with a cooperating stationary slit 11, Figs. 1 and 2. The slit 11 functions to limit the modulated light through the modulating tracks, 4 to 10 inclusive, to a narrow dimension along the traveling dimension of the tracks, so that the resultant modulation of luminous flux is substantially proportional to the instantaneous width of the modulating tracks passing by slit 11.

In Fig. 1, 12 is a source of luminous flux, preferably of the type of incandescent lamp commonly used in sound reproducer systems, which produces a straight line of light formed by a coiled filament. Source 12, is held in position by supports 45 and 46, fixed to frame 44 of motor 1.

An optical condensing system 13 directs the line of light of source 12 onto modulating disc 3 and slit 11.

Optical system 14 gathers the light emerging through slit 11 and directs it towards a photoelectric cell 28, fixed in position by supports 48 and 49 and secured to the outer flange of member 47.

When it is desired to signal modulate the luminous flux emerging from optical system 14, I provide member 47 with a hollow reflecting surface 31 and a signal modulating device 15. Modulating device 15 may be any suitable means, such as for instance, a paper tape having printed signal characters on it. If the signal modulating device 15 is translucent, the signal modulated flux follows the light path indicated by 27, and when the signal modulating device 15 has a high coefficient of reflection, the reflected modulated flux from the modulating device 15 follows the path 32 to the reflector 31 and thence along the path 33 to the cathode of the photoelectric cell 28. A detailed description of the operation of Fig. 1 as a signal modulation device, is more comprehensively described in my copending applications, Serial Nos. 496,903, filed July 31, 1943, now Patent No. 2,380,666, which issued July 31, 1945; 497,347, filed August 4, 1943, now Patent No. 2,380,667, which issued July 31, 1945; 531,895, filed April 20, 1944, now Patent No. 2,415,702, which issued February 11, 1947; and 599,007, filed June 12, 1945, now Patent No. 2,425,950, which issued August 19, 1947.

The output of photoelectric cell 28 is applied to an amplifier 29, thence to a filter 30, the output of which is directed to the transmission circuit or to what other transmission medium is employed. In some cases the transmission circuit provides sufficient filtering without the employment of the lumped circuit filter 30.

Referring to Fig. 3, abscissa A shows a complete sine wave or, trigonometrically speaking, a complete cosine wave, the amplitudes of which it is desired to employ to continuously modulate the light flux through one of the modulation tracks, 4 to 10 inclusive, Fig. 2. It is obvious that if any such complete wave were applied to any one of the entire circular tracks 4 to 10 inclusive of Fig. 2, the result would be that the disc would be completely sheared by the modulation pattern into concentric rings, and if all the tracks had such modulation patterns perforated in them, the result would be a plurality of disconnected rings which would have no means of mutual support. Such a modulation pattern as shown along abscissa A, when applied to any form of continuous modulation track, has to be supported and I do so by tying the two modulation boundaries together to preserve the integral structure of the modulator.

The applicant has discovered that he can tie the two parts together, forming the boundaries of the modulation pattern, without destroying the sinusoidal character of the modulated flux, within the frequency response of the system employed, provided certain structural features are embodied in the modulator.

Referring to Fig. 3, along abscissa C is shown one structure embodying the present invention of tying the two parts together which form the modulation boundaries. Referring to abscissa C, the structure within the rectangle formed by the boundaries 50, 51, 52 and 53 forms a small section cut out of disc 3, as indicated thereon by corresponding numerals. In Fig. 3, the boundaries 51 and 53 are illustrated as straight, as this form of development of the track lends itself to clearness of teaching the forms of modulation perforations employed in the use of the invention.

The curve 54 has the continuous form of the cosine curve of abscissa A, and to prevent the modulation boundary of the curve 54 from severing the section 55 from section 56, crossties such as 57 and 58 are employed to physically maintain sections such as 55 and 56 in an integral form.

In some cases, cantilever forms of crosstie-members, such as 59, are employed for purposes hereinafter set forth in the specification.

Each of the tracks 4 to 10 inclusive, in Fig. 2, are completely circular and each track has a modulation pattern perforated into it like that illustrated along abscissa C, Fig. 3. The modulation pattern in each track provides a different fundamental carrier-frequency, as is well understood in the art of carrier-current signal systems, and to obviate certain difficulties which would otherwise be set up in the amplifier systems employed in this art, the frequencies employed in tracks 4 to 10 inclusive, are specified to be, as commonly employed in the art, odd harmonic frequencies of some assumed fundamental wave. In the present invention where seven carrier-frequencies are employed, I prefer to use the 7th, 9th, 11th, 13th, 15th, 17th and 19th harmonic, for reasons set forth in my Patent 2,370,985, March 6, 1945.

By employing such a series of frequencies and considering all these frequencies as fundamental frequencies themselves, the 3rd harmonic of the 7th harmonic considered as the fundamental, is the 21st harmonic of the primary fundamental considered. Since the 19th harmonic of the primary fundamental is the highest frequency employed in this series, the 21st harmonic lies outside of the frequency band required to transmit the seven frequencies specified. If the 3rd harmonic of the lowest carrier-frequency employed is outside of the frequency band required for transmission, then the 3rd harmonic of any and all of the other frequencies will also lie outside of this band. This means that by making the wave form of the carrier-frequencies employed all free of 2nd harmonics, any 3rd harmonic modulation upon these frequencies will be outside of the transmission band and therefore the harmonics will behave in the system substantially as if they were sinusoidal even in the presence of some 3rd harmonic modulation.

Further, some of these frequencies may contain a 2nd harmonic provided the 2nd harmonic is outside of the band of frequencies employed in the transmission system. Since the highest frequency in the transmission band is the 19th harmonic, a 2nd harmonic modulation would be permissible upon the 11th harmonic of the primary fundamental wave, because the 2nd harmonic of the 11th harmonic is the 22nd harmonic of the primary fundamental wave.

The broadest aspect of my invention is set forth in the claims hereunder, and since the broadest aspect of the invention set forth in specificative form would involve such extended mathematical analysis, it is believed that the nature of the invention can be more clearly taught to those skilled in the art by limiting the mathematical analysis of the operation of the invention to simplified mathematical procedure and to a graphical representation of one simple embodiment of the invention.

It will now be shown how the disc 3 can be perforated with a modulation pattern in each of its several tracks, 4 to 10 inclusive, following some fundamental frequency such as shown along abscissa A, Fig. 3, by properly selecting the number and spacing of the crossties employed such as 57 and 58, and in some cases, cantilever form of crosstie-members such as 59.

A simplified form of Fourier's analysis will be employed in disclosing the structural features of one embodiment of the invention. As pointed out above, in some limited number of frequencies in a series, the presence of a 2nd harmonic may lie outside of the transmission band, and this is true for some of the several frequencies assigned to the modulation tracks 4 to 10 inclusive. However, since the elimination of 2nd harmonics from all the modulation tracks with the presence of a 3rd harmonic in all of the modulation tracks provides a single modulation pattern, for teaching purposes, directions for employing such a single pattern will now be discussed in terms of Fourier's analysis.

The modulation pattern illustrated along abscissa C is a combination of the cosine curve illustrated along abscissa A, and the crossties 57, 58 and the cantilever form of crosstie-member 59 plotted in Cartesian coordinates along abscissa B. The plot of the rectangles along abscissa B, which may be referred to mathematically as a curve including that part of the plotting lying in the base line and may be regarded as the modulation pattern illustrated along abscissa C with the cosine curve illustrated along abscissa A subtracted from it, so that the Fourier analysis need only be applied to the curve along abscissa B, because the form of the curve along abscissa A is known. For purposes of mathematical analysis, it is immaterial whether the modulation is positive or negative, since the harmonic content is unchanged by a change of algebraic sign.

The crossties employed to tie together members 55 and 56 may be any number from 1 per cycle of the fundamental wave along abscissa A, up to any practical number desired, the limitation being that regardless of the number of crossties employed, they must be equally spaced so that their fundamental frequency is a constant value, as the modulation tracks travel past the slit 11 of Fig. 2.

It is obvious from the theory of Fourier's analysis that the fundamental frequency of the series which represents the curves along abscissa B must be represented by the spacing between crossties. This means that if one crosstie per cycle of the curve illustrated along abscissa A is employed, the fundamental frequency involved in the series representing this single crosstie will be the same as that of the curve along abscissa A. If two crossties per cycle of the curve along abscissa A are employed, the fundamental frequency of the series representing these two crossties per cycle, will be a 2nd harmonic of the fundamental frequency considered. Likewise, if three equally spaced crossties are employed per cycle of the fundamental frequency considered, the fundamental frequency of the series representing these three crossties per cycle, will be a 3rd harmonic of the primary fundamental considered, and so on by mathematical induction, the fundamental frequency of any Fourier series representing any number of crossties per fundamental period, will be an harmonic of the fundamental frequency considered and having an order represented by the number of crossties per period. These statements are based on the assumption that all the rectangles, representing the crossties and the cantilever forms thereof, have equal altitudes.

The reason for employing the cantilever form of crosstie members such as 59, is due to the fact that in order to make the fundamental period of the curve plotted along abscissa B equal to the spacing between the components shown, it is necessary to have the altitude of all the rectangles of the curve equal, otherwise a lower frequency fundamental is introduced.

It is, of course, possible to construct crossties and cantilever forms thereof which have different altitudes, and even different bases, in an embodiment of my invention, but the lowest frequency produced by any such structure will be governed by the lowest period formed by any reiterated sequence of crossties and cantilever forms thereof which have different altitudes and/or different bases. For simplicity, I prefer to use crossties and cantilever forms of crosstie members which all have the same altitude, and the embodiment of my invention herein will be limited to such structure.

Obviously then, if an equal base crosstie bridging the entire width of the modulation pattern were substituted for the cantilever form 59, the lowest frequency introduced by the crosstie structure would not be the 3rd harmonic, but that of the period of the reiterations in the sequence which is equal to the fundamental. This fundamental would be accompanied by a Fourier series of harmonics, which is not the result sought.

In order to go to a more formal mathematical exposition of my invention, the altitudes of all the rectangles of the curve along abscissa B will be taken as equal and the effect of unequal altitudes will be discussed with variations in the bases thereof, hereinafter.

A more formal disclosure of my invention will now be made mathematically with the aid of analysis by Fourier series.

As pointed out before, the basis of understanding the invention lies extensively in a comprehension of the effect of such curves, as illustrated along abscissa B, in modulating the fundamental sinusoidal wave employed, such as that illustrated along abscissa A. The mathematical teaching will then reside in the mathematical analysis of curves, such as those which lie along abscissa B.

If $f$ represents the ordinates of a continuous curve, such as illustrated along abscissa B, which of course includes ordinates of zero value which lie in the abscissa axis, then $$f = \sum_{n=1}^{n=\infty} A_n \sin n(\omega t) + \sum_{n=1}^{n=\infty} B_n \cos n(\omega t) + C \quad (a)$$

This is the well known equation representing a complete Fourier series which includes sine terms, cosine terms and a constant. $A_n$ represents the amplitude of the sine terms, $n$ represents the integer order of the frequency, $B_n$ the amplitude of the cosine terms and $C$ a constant quantity.

$A_n$, $B_n$ and $C$ are defined below in the well established equations which determine these three constants:

$$A_n = \frac{1}{\pi} \frac{1}{n} \int_0^{2\pi} f \sin n(\omega t) d(d\omega t) \quad (b)$$

$$B_n = \frac{1}{\pi} \frac{1}{n} \int_0^{2\pi} f \cos n(\omega t) d(n\omega t) \quad (c)$$

$$C = \frac{1}{2\pi} \int_0^{2\pi} f d(\omega t) = \begin{cases} \text{average ordinate of} \\ \text{area under crossties} \end{cases} \quad (a)$$

For the sake of simplicity and ease of teaching, the maxima of the curve shown along abscissa B will be taken to extend along the entire crest of the curve, as shown in the figure. While this is not essential to an embodiment of my invention, this assumption greatly simplifies the mathematical teaching. With the assumption that the crests of the curve representing the modulating members, as illustrated along abscissa B, are flat, Equation $b$ may be simplified in the following form:

$$A_n = \frac{1}{\pi} \frac{F}{n} \int_{\text{lower limits of bases}}^{\text{upper limits of bases}} \sin n(\omega t) d(n\omega t) = \frac{-1}{\pi} \frac{F}{n} \left[ \cos n(\omega t) \right]_{\text{lower limits}}^{\text{upper limits}} \quad (b)$$

where $F$ represents the constant altitude of the maxima shown along abscissa B.

With the same assumption with reference to $F$, Equation $c$ is simplified to the following form:

$$B_n = \frac{1}{\pi} \frac{F}{n} \int_{\text{lower limit of bases}}^{\text{upper limit of bases}} \cos n(\omega t) d(n\omega t) = \frac{1}{\pi} \frac{F}{n} \left[ \sin n(\omega t) \right]_{\text{lower limits}}^{\text{upper limits}} \quad (f)$$

The value of C becomes, $$C = \frac{nFT}{2\pi} \quad (g)$$

where $T$ represents the thickness of the graphical plot of the crossties and cantilever forms thereof, as illustrated in the figure.

With these simplified assumptions, the determination of the coefficients $A_n$ and $B_n$ are reduced to a simple integration of sine and cosine terms, as carried out in $(e)$ and $(f)$.

The final form of Equations $e$ and $f$ may be applied at once to the analysis of the curve along abscissa B by assigning the harmonic order $n$ sought after, and the upper and lower limits of integration desired, and which limits are fixed by the thickness $T$ of the crosstie members and cantilever forms thereof.

The final form of Equation $f$ is written along line E, Fig. 3, with the upper and lower limits of integration shown in the curve along abscissa B, properly assigned to the integration. The equation for $B_n$ shown in the figure may be applied to any harmonic order $n$, for the three crossties and cantilever forms thereof shown and positioned as per the curve along abscissa B.

Along line E is plotted the three first terms representing the values $n=1$, $n=2$, $n=3$ of the sine terms which appear in the equation of $B_n$. With these sine terms plotted out, a graphical picture of the integration is presented which not only facilitates a clear understanding of the equation but further, obviates the necessity of employing trigonometric tables.

Taking the first term, represented by $n=1$, it will be obvious by observing graphically the numerical values and algebraic signs in the plot of this curve which represents the terms of the equation $B_n$ for $n=1$, that $B_n=0$. Following the same procedure for $n=2$, it will be found that $B_n=0$. Following the same procedure for $n=3$, it will be found that $B_n$ has a numerical value greater than 0, and if $$T = \frac{\pi}{15}$$

the amplitude of the 3rd harmonic =

$$\frac{3F}{5\pi}$$

the algebraic sign depending upon the initial conditions assumed. This demonstrates that the modulation pattern shown along abscissa C introduces no fundamental and no 2nd harmonic modulation represented by the cosine terms of Equation $a$, which has the same fundamental period as that of the curve along abscissa A. By mathematical induction, the introduction of a higher number of crossties and/or cantilever forms thereof, will result in the elimination of all cosine terms of Equation $a$ up to that represented by the fundamental period of the crosstie and cantilever forms thereof employed.

This demonstration so far has taken into consideration only the $B_n$ or cosine terms of Equation $a$, as related to the specific embodiment given herein.

Going to Equation $f$ and applying the same limits of integration as before, $A_n$ is given along the line F, and by applying the same procedure to the righthand member of the equation representing $A_n$ that was applied to the righthand member of the equation representing $B_n$, it will be found that $n=1$, $n=2$ and $n=3$, that $A_n=0$ for each and all of these terms. This equation may be employed to find values of $A_n$ for values of $n$ in excess of 3 of course, but since it is only proposed to demonstrate that the modulation pattern of C introduces no harmonics of the fundamental shown along abscissa A lower than the 3rd and as this has been done, no further demonstration will be made.

It is believed that no discussion of the term C is necessary since its significance is obvious and its straight line character is outside of the discussion of harmonic content.

Fig. 3 along line G is plotted the values of C and those of the 3rd harmonic modulation generated by the introduction of the crossties and the cantilever forms thereof shown in the modulation patterns illustrated along abscissa C.

Thus, I have disclosed one embodiment of my invention in which it has been shown that the introduction of crossties and cantilever forms thereof, as disclosed in the specification and drawings, results in a modulation of the fundamental frequency, which modulation is free of harmonics of all orders up to that represented by the fundamental period of the frequency of the crossties and cantilever member forms thereof.

It is quite obvious that the altitudes of the rectangles representing the crossties and/or cantilever forms thereof, may not only be varied but that the thickness thereof may be also varied; for instance, instead of the cantilever 59 having a base T equal to the bases of the crossties, a crosstie may be substituted therefor extending across the entire perforation like crosstie 57, and the base of the substituted crosstie may be narrowed down to compensate for the added altitude.

A very large number of variations, modifications and changes may be made in the structure and system disclosed, and the scope of these can be best carried out by a study of the mathematical disclosure given herein, as applied to such variations, modifications and changes.

Having described one embodiment of my invention, what is claimed is:

1. A luminous flux modulator for continuous movement between a source of light and a photoelectric cell comprising a sheet of opaque material having a continuous series of spaced openings therein arranged in a closed path, said series of openings having a form composited from an interrupted line parallel to said path and an interrupted sine curve having a number of complete periods within said series, the axis of said curve being parallel to said line, the interruptions in said line and curve being formed by integral bars of said material extending transversely of said path, some bars comprising spacers between said openings, said bars all extending for the same transverse distance from and interrupting the continuity of the said line at least three times for each complete period, the bars being so spaced that as the openings modulate the light in accordance with said curve the bars provide a harmonic higher than the second of the fundamental of said sine curve.

2. A luminous flux modulator for continuous movement between a source of light and a photoelectric cell comprising a sheet of opaque material having a continuous series of spaced openings therein arranged in a closed path, said series of openings having a form composited from the space between two interrupted curved lines running generally parallel to the line of direction of said path, the width of said space being determined by the ordinates of an interrupted sine curve having a number of complete periods within said series, the axis of said sine curve being parallel to said line of direction, the interruptions in said space formed by integral bars of said material extending transversely of said path, some bars comprising spacers between said openings, said bars all extending for the same transverse distance from and interrupting the continuity of one of said curved lines at least three times for each complete period, the bars being so spaced that as the openings modulate the light in accordance with said sine curve the bars provide a harmonic higher than the second of the fundamental of said sine curve.

3. A luminous flux modulator for continuous movement between a source of light and a photoelectric cell comprising a sheet of opaque material having a continuous series of spaced openings therein arranged in a closed path, said series of openings having a form composited from the space between two interrupted curved lines running generally parallel to the line of direction of said path, the width of said space being determined by the ordinates of an interrupted sine curve having a number of complete periods within said series, the axis of said sine curve being parallel to said line of direction, the interruptions in said space formed by integral bars of said material extending transversely of said path, some bars comprising spacers between said openings, some bars being of a cantilever form and extending into said openings at a greater transverse opening width than the length of any of said bars, said bars all extending for the same transverse distance from and interrupting the continuity of one of said curved lines at least three times for each complete period, the bars being so spaced that as the openings modulate the light in accordance with said sine curve the bars provide a harmonic higher than the second of the fundamental of said sine curve.

MONTFORD MORRISON.

REFERENCES CITED

The following references are of record in the file of this patent:

UNITED STATES PATENTS

| Number | Name | Date |
| --- | --- | --- |
| 1,213,147 | Blair | Jan. 23, 1917 |
| 1,548,260 | Espenschied | Aug. 4, 1925 |
| 1,593,619 | Carpe | July 27, 1926 |
| 2,014,741 | Lesti | Sept. 17, 1935 |
| 2,031,764 | Eremeeff | Feb. 25, 1936 |
| 2,169,842 | Kannenberg | Aug. 15, 1939 |
| 2,193,875 | Lindenblad | Mar. 19, 1940 |
| 2,370,985 | Morrison | Mar. 6, 1945 |
| 2,380,666 | Morrison | July 31, 1945 |